United States Patent [19]

Dey et al.

[11] 4,060,676
[45] Nov. 29, 1977

[54] METAL PERIODATE ORGANIC ELECTROLYTE CELLS

[75] Inventors: Arabinda N. Dey, Needham; Robert W. Holmes, Dedham, both of Mass.

[73] Assignee: P. R. Mallory & Co. Inc., Indianapolis, Ind.

[21] Appl. No.: 718,246

[22] Filed: Aug. 27, 1976

Related U.S. Application Data

[62] Division of Ser. No. 584,314, June 6, 1975, abandoned, which is a division of Ser. No. 245,510, April 19, 1972, Pat. No. 3,904,432.

[51] Int. Cl.² ............................................. H01M 4/62
[52] U.S. Cl. ........................................ 429/217; 429/219; 429/220; 429/221; 429/223; 429/225
[58] Field of Search ............................ 429/219–221, 429/223, 218, 225–229, 194, 217; 106/286, 297, 304

[56] References Cited

U.S. PATENT DOCUMENTS

| 2,536,696 | 1/1951 | Ruben | 429/190 |
| 2,921,110 | 1/1960 | Crowley et al. | 429/29 |
| 3,484,295 | 12/1969 | Dawson | 429/144 |
| 3,736,184 | 5/1973 | Dey et al. | 429/194 |

Primary Examiner—Charles F. LeFevour
Attorney, Agent, or Firm—Ronald S. Cornell; Israel Nissenbaum; Charles W. Hoffmann

[57] ABSTRACT

A cathodic active material is described utilizing the periodates of heavy metals and preferably of silver. These materials are particularly suitable for use as positive electrodes in nonaqueous electrolyte cells and such electrodes and the cells are described. A method for fabrication of the active material into cathodes is included.

5 Claims, 6 Drawing Figures

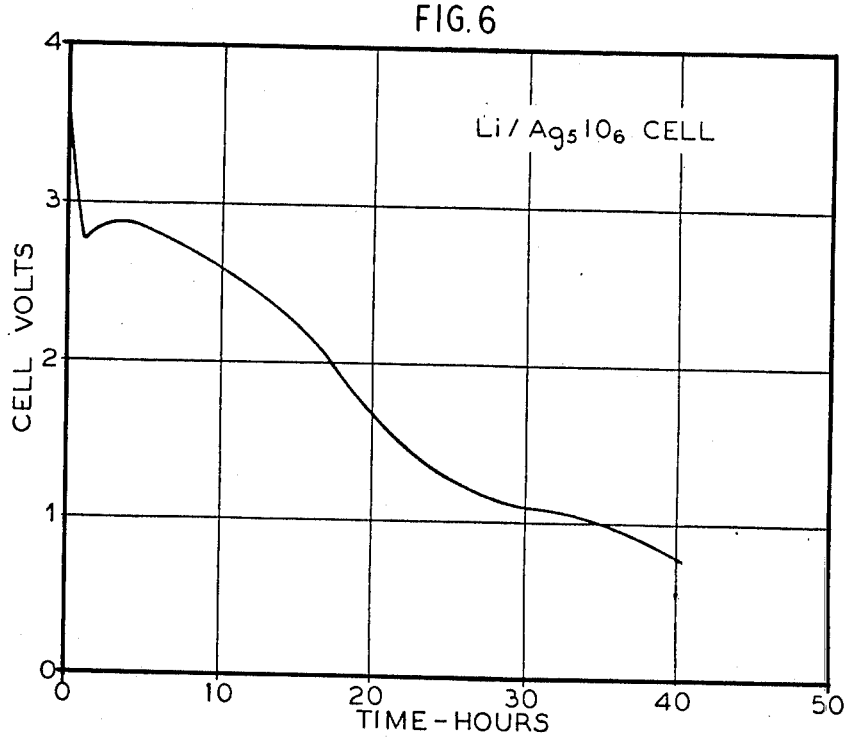

METAL PERIODATE ORGANIC ELECTROLYTE CELLS

This is a division of application Ser. No. 584,314, filed June 6, 1975 now abandoned which was a division of Ser. No. 245,510 filed Apr. 19, 1972 and now U.S. Pat. No. 3,904,432 isued Sept. 9, 1975.

FIELD OF THE INVENTION

This invention relates to high-energy-density electrochemical energy generators and more particularly to such generating cells and batteries having organic electrolytes and utilizing as cathodic material the periodates of certain metals.

BACKGROUND OF THE INVENTION

Metal periodates are unstable in acid or alkaline solutions. For this reason it has not previously been possible to use such materials as depolarizers for conventional acid or alkaline primary or secondary cells.

The object of this invention is to provide novel electrode chemical energy generators with:
 a. high voltages,
 b. high energy densities,
 c. high material utilization efficiencies
 d. no spontaneous gasing This invention is based upon the use, as active cathode material of the oxy acids of iodine in the form of metal salts with certain heavy metals. The periodates of copper, silver, iron, cobalt, and mixtures thereof are particularly suitable as depolarizers for this invention. Such active cathodic materials are used in conjunction with nonaqueous electrolytes in electrochemical generators. The electrochemical generators for the utilization of such active materials include, as anodic material, active light metals preferably of the type of lithium, sodium, potassium, etc.

Within the ambit of this invention are the novel active cathodic materials; cathodes prepared from such novel cathodic material; methods of making such cathodes from said active materials and the complete electrochemical generators using such active cathodic and anodic materials in conjunction with non-aqueous electrolytes. Broadly stated according to the principles of the present invention, there is provided an electric cell comprising a light metal anode, a heavy metal periodate cathode, and an organic electrolyte.

Light metals suitable for the purpose of the present invention are selected from among lithium, sodium, potassium, beryllium, calcium, magnesium, and aluminum. In some cases, it is desirable to amalgamate the surface of the anode metal with mercury as the performance of certain light metal anodes for such cells can be considerably improved by such amalgamation. By surface alloying these metals with mercury by chemical displacement of the latter from solutions of a mercury salt, a notable improvement of the anodes is provided. The improvement is particularly striking with anodes formed of aluminum, magnesium, or their alloys. Amalgamation may be successfully carried out by bringing the anode metal into contact with mercuric salts dissolved in N:N dimethyl formamide, gamma-butyrolactone, acetone or in other suitable solvents. Among useful mercuric salts for such solution are mercuric chloride, mercuric nitrate, mercuric acetate, mercuric chlorate, mercuric bromide and mercuric thiocyanate. Generally speaking the principles of selection of a suitable system (solute-solvent) for amalgamation of the following:

a. The mercury salt should be soluble in the solvent.
 b. The anion of the mercury salt should form salts with the anode metal, that are also soluble in the solvent employed to dissolve the mercury salt.
 c. The solvent should be stable in the presence of the anode metal and its amalgam, more particularly it should not decompose evolving hydrogen, as would be the case with acetic acid.

The active metal anodes are amalgamated to reduce local action on the anode surface thus providing consistant and reproduceable electrochemical results. Specifically it has been noted, with aluminum and magnesium anodes, that amalgamation assures elimination of the usual time lag for initiation of the current flow. With anodes of such metals and their alloys the usual time lag is reduced to less than $10^{-3}$ seconds.

The novel cathodic material or depolarizers used in the present invention are the heavy metal salts of the oxy acids of iodine. The periodates ($IO_6^{-5}$) of copper, silver, iron, cobalt, nickel, mercury, thallium, lead, and bismuth and mixtures thereof are particularly suitable as the active cathodic or depolarizer materials for cells to be used in conjunction with the above mentioned active light metal anodes. The silver periodate, $Ag_5IO_6$ is preferred.

Suitable electrolytes may be made by dissolving organic or inorganic salts of light metals in the organic solvents. For example, 1-2 Molar solutions of lithium perchlorate, or lithium aluminum chloride dissolved in tetrahydrofuran solvent constitute a suitable organic electrolyte. Other light metal salts are based upon the cations of the light metals such as lithium, sodium, beryllium, calcium, magnesium or aluminum with anions such as perchlorate, tetrachloroaluminate, tetrafluoroborate, chloride, hexafluorophosphate, hexafluoroarsenates, etc. dissolved in organic solvents. Among suitable organic solvents are tetrahydrofuran, propylene carbonate, dimethyl sulfide, dimethyl sulfoxide, N-nitrosodimethylamine, gamma-butyrolactone, dimethyl carbonate, methyl formate, butyl formate, acetonitrile and N:N dimethyl formamide.

This invention in addition to the electrochemical system mentioned above also contemplates cells and batteries utilizing this system which are simple in construction reliable and safe in operation, and which may be readily manufactured and sold on a practical and commercial scale at a low cost. Similarly included within the ambit of this invention is the method of manufacture of the cathodes from the cathodic materials.

These and other aspects and objects and advantages of the present invention will be, apparent from the following description taken in conjunction with the accompanying drawing in which.

Figure 4:
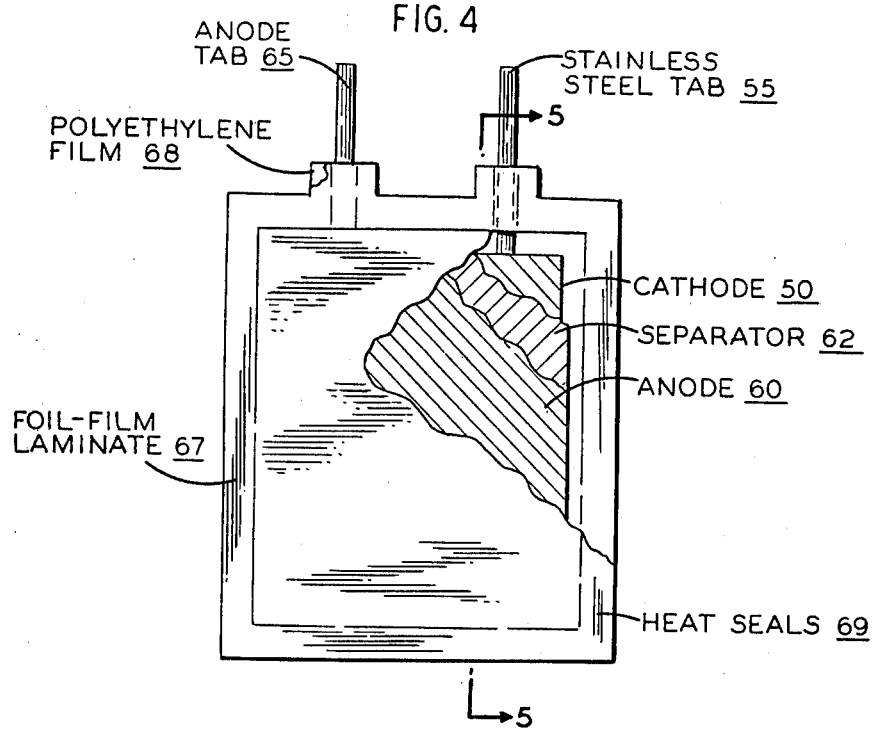

The current collectors of FIG. 4 shows a side view of a cell in its individually sealed envelope useful according to another aspect of this invention.

Figure 5:
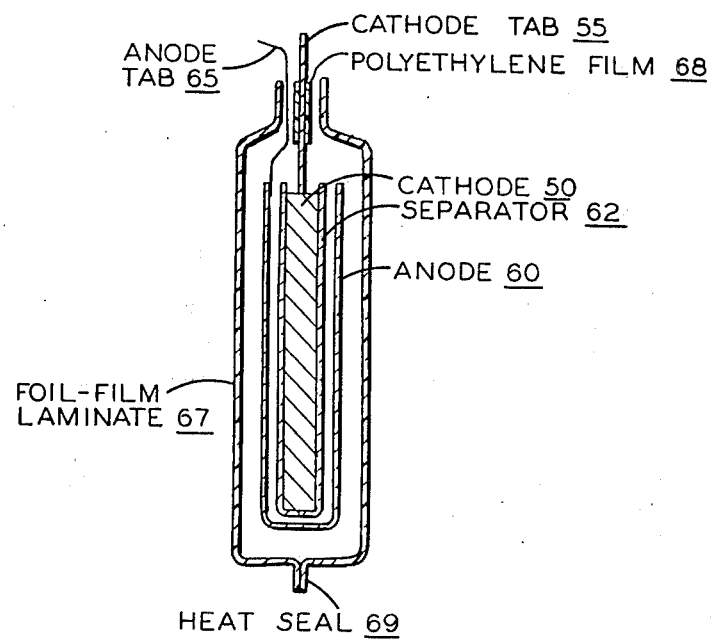

FIG. 5 shows a sectional view of the cell according to FIG. 4, said section being taken along line 5—5 of FIG. 4.

FIG. 6 is a discharge curve of a lithium/$Ag_5IO_6$ cell according to this invention.

Figure 1:
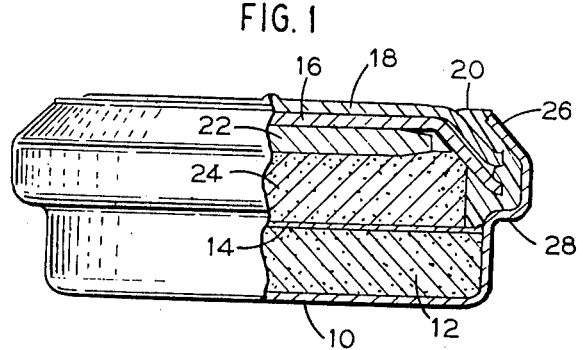
FIG. 1 is a vertical sectional view, having parts in elevation embodying a commercial cell according to this invention.

Referring now particularly to FIG. 1 of the Drawing, the structure used and the procedure followed in assembling a practical cell and embodying this one aspect of this invention will be described.

Reference numeral 10 denotes a cathode container made of stainless steel, in which there is compressed a body of cathode mix 12. This cathode mix employing the cathodic material of this invention is a pre-mixed and pre-slugged mixture of the powdered depolarizer comprising the heavy metal periodates and graphite or any similar conductive carbon in a weight ratio of approximately seven parts of depolarizer to three parts of graphite. The pre-mixture is bonded with approximately 3% by weight of a aqueous dispersion of polytetrafluoroethylene commercially available as colloidal Teflon (Dupont de Numours Co. Inc.). After the water in the dispersion has been displaced by an organic solvent such as isopropanol or benzene, the cathodic mixture is compressed. After compression, it is preferred to dry and cure the previously compressed cathode mixture at temperatures of approximately 300° C for about 2 hours. A thin barrier or separator layer 14 of a microporous inert material such as fiber glass is then placed in the cathode container 10 on top of the compressed cathode mix 12.

The top closure of the cell comprises inner top disc 16 made of stainless steel and outer top disc 18, likewise made of stainless steel, the two top discs having their center portions nested in and their edge portions slightly separated from each other. An insulating and sealing grommet 20 of a suitable elastomer such as neoprene, or polyethylene, is stretched or molded around the circumferential edges of top discs 16 and 18. A detailed description of the assembly and operation of this so called "double top" structure will be found in Williams U.S. Pat. No. 2,712,565 and Clune U.S. Pat. No. 3,096,216 to which reference is hereby made. In inner top disc 16 there is anode 22 cut from a plate of the anode metal, for example lithium, to fit the inner dimension of said disc. A body of an electrolyte absorbent 24, such as cotton is interposed between anode 22 and the cathode mix 12. Onto this electrolyte absorbent 24 is deposited about 0.5 cc's of an electrolyte such as 1 molar lithium perchlorate dissolved in propylene carbonate. Thereupon, the cell is assembled and permanently sealed by crimping bown enlarged mouth portions 26 of cathode container 10 over grommet 20 which is thus strongly compressed between the said mouth portions and the annular shoulder 28 of the container. Any excess electrolyte present is squeezed out during the final assembly of the cell.

Figure 2:
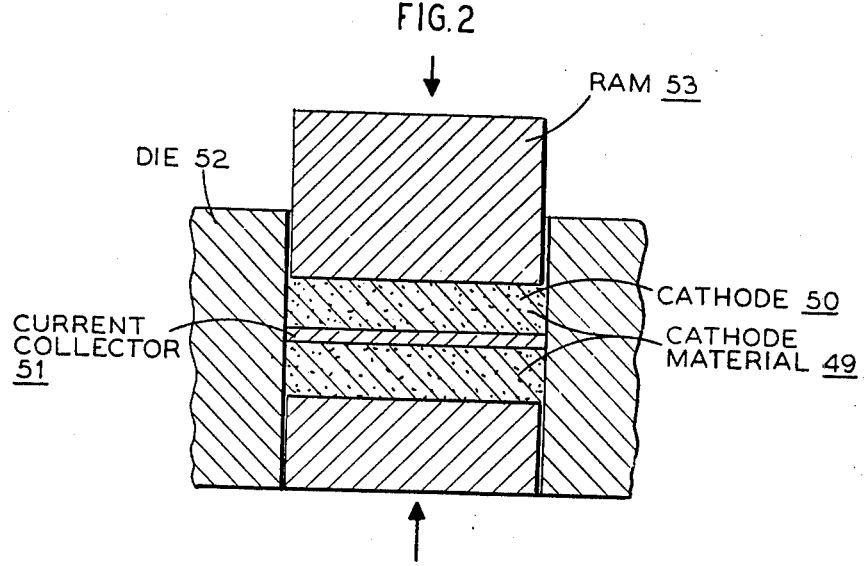
FIG. 2 shows a method of manufacture of the cathode according to one aspect of this invention ready for compression in a molding die.
Figure 3:
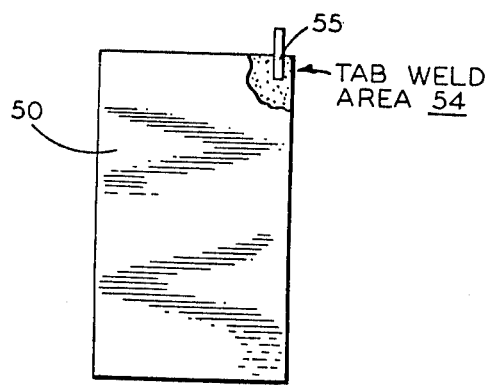
FIG. 3 shows a finished cathode according to one aspect of this invention including a tab welded area for affixing current collecting leads.

FIGS. 2 and 3 show a schematic method for manufacture of cathodes useful in the manufacture of sealed individual cells which may be assembled into batteries. In the cathode construction according to this aspect of the invention, the cathodes 50 are fabricated by comprising a pre-mixed and pre-slugged mixture 49 of powdered depolarizer and graphite in a 7:3 weight ratio with approximately 3 parts by weight of a binder. The preferred binder is 3% by weight of a aqueous dispersion of polytetrafluoroethylene, commonly known as colloidal Teflon (Dupont de Numours Co. Inc.). The water of this aqueous dispersion is then displaced by adding a sufficient amount of an organic solvent such as isopropanol, benzene, etc. to form a paste added to the mix. The paste is then throughly mixed to form a easily pliable dough. Any excess solvent is decanted. The cathodes 50 are molded on, and around nickel current collector 51, preferably fabricated from metal screening or expanded metal, by placing layers of the dough above and below the current collector 51 which is in turn placed in a rectangular die 52 and then pressing the dough at pressures 70–80,000 lbs/in$^2$ by ram 53. The process is shown schematically in FIG. 2. The excess solvent such as isopropanol is squeezed out of the dough and there results a compact rectangular cathode 50 with adequate mechanical integrity for further treatment. This cathode 50 is then dried in air and preferably cured at a temperature between 200°–350° from 1½ to 3 hours. Optimally the curing treatment is 300° C for 2 hours. The curing process enhances the mechanical integrity of the cathode even further. The electrical conductivity of such a cathode is more than adequate for its purpose. In the above method, the ratio of active material to graphite or other conductive inert additive and the ratio of the total mix to binder can be varied widely.

The nature of the binder can also be varied to a considerable extent. The binder may include both organic and inorganic compounds. Organic binders in addition to the colloidal Teflon are polyethylene dissolved in xylene, ethyl cellulose dissolved in xylene, and so forth. Other polyolefin polymers may similarly be used. Inorganic binders which may be used include plaster of Paris proprietary dental cements. The purpose of the pressure is to mechanically consolidate the cathode mixture. The preferred pressure is 70,000 lbs/in$^2$.

When curing the cathodes, the curing temperature can be varied from 100° to 400° C and the curing time should be varied according to the temperature.

A corner 54 of the cathode 50 after heat treatment made according to the above procedure, is scraped to bare a portion of the current collector 51 to which a tab 55 is spot welded for electrical connection. The finished cathode is shown in FIG. 3. This cathode, used in conjunction with lithium anodes, is shown in a side view of the cell at FIG. 4 including partial cut-outs.

A section of FIG. 4 long lines 5—5 is shown in FIG. 5. The cathode 50 is used in conjunction with two lithium anodes 60, prepared by pressing two rectangular pieces of lithium metal approximately 0.02 inches thick, on expanded stainless steel. This cell is constructed in parallel plate configuration. A layer of filter paper 62 is interposed between the lithium anode 60 and the cathode 50 to provide a separator 62 and an electrolyte absorber 62. The cell is enclosed in a polymer and foil-laminate enclosure 67. Foil-laminate film cells are heat-sealed around the periphery preferably by heat seals 69. At the upper end where the cathode tabs 55 and anode tabs 65 leave the cell structure proper, portions of polyethylene film 68 are affixed to the tabs to provide leak proof seals. Before sealing the cells 3cc's of 1.0 molar solution of lithium perchlorate (LiClO$_4$) in tetrahydrofuran is added to each cell enclosure and the cell is permanently heat sealed. The cells according to this type of construction are cathode limited, i.e. the cathode has a lower capacity than the anode. They may be assembled into batteries by series or parallel connections.

OPERATION

All the cells are discharged using a constant current of 4.5 ma corresponding to a current density of 1 ma/cm² based on the geometric area of both the sides of the cathode. This corresponds to a 10–30 hour rate. The operating characteristics of a cell under the above type of load is shown in Table 1.

TABLE 1

Operating Characteristics of a Li/Metal Periodate Organic Electrolyte Cell

| | Cell | Open Circuit Voltage | Average Operating Voltage | Cathode Material Utilization Efficiency (%) |
|---|---|---|---|---|
| 2. | Li/Ag$_5$IO$_6$ (FIG. 6) | 3.5 | 2.3 | 100% |

The cell showed high open circuit and operating voltages compared to the conventional alkaline cells.
The discharge characteristics of the cell is shown in FIG. 6.
The system, Li/Ag$_5$IO$_6$, is particularly important for its high and exceedingly steady output voltage. The assumed cathode reactions for this cell is:
Ag$_5$IO$_6$ + 11Li$^+$ + 11e → 5Ag + LiIO + 5Li$_2$O
The anodic reaction in the above cell is Li → Li$^+$ +e.

For the lithium anodes there may be substituted, in the same molar proportion sodium, potassium, rubidium, and cesium. Stoichiometric equivalents of beryllium, calcium, magnesium, barium, strontium and aluminum may be substituted for the lithium.

The present invention has been disclosed by reference to preferred embodiments thereof. However, variations and modifications may be resorted to by those skilled in the art without departing from the principles of this invention. All the variations and modifications are considered to be within the true spirit and scope of the present invention as disclosed in the foregoing description and including present art recognized equivalents for the various components.

What is claimed is:

1. A solid cathodic electrode for a non-aqueous electrochemical cell wherein the cell comprises at least one positive electrode, at least one negative electrode, and an organic electrolyte with the electrodes disposed therein; the positive electrode, comprising the cathodic composition, including a periodate selected from the group consisting of silver, copper, iron, cobalt, nickel, mercury, thallium, lead, and bismuth and electrochemically inert conductive materials and binders wherein said periodate is substantially insoluble in said organic electrolyte.

2. The cathodic electrode composition of claim 1, wherein the electrochemically inert conductive material is graphite.

3. The cathodic electrode composition of claim 1, wherein the cathode active material is a silver periodate.

4. The cathodic electrode material of claim 1, wherein the binder is polytetrafluoroethylene.

5. The cathodic electrode of claim 3 wherein said silver periodate is Ag$_5$IO$_6$.

* * * * *